(12) United States Patent
Sethi et al.

(10) Patent No.: US 11,750,468 B2
(45) Date of Patent: Sep. 5, 2023

(54) PROACTIVE ASSET FAILURE REMEDIATION UTILIZING CONFORMAL ASSET STATE PREDICTION

(71) Applicant: Dell Products L.P., Round Rock, TX (US)

(72) Inventors: Parminder Singh Sethi, Ludhiana (IN); Lakshmi Saroja Nalam, Bangalore (IN); Avinash Vishwanath, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 12 days.

(21) Appl. No.: 17/346,398

(22) Filed: Jun. 14, 2021

(65) Prior Publication Data

US 2022/0400060 A1     Dec. 15, 2022

(51) Int. Cl.
   *G06N 7/01*     (2023.01)
   *H04L 41/0604*     (2022.01)
   *H04L 41/142*     (2022.01)
   *H04L 41/0631*     (2022.01)
   *H04L 41/5022*     (2022.01)
   *H04L 41/0654*     (2022.01)
   (Continued)

(52) U.S. Cl.
CPC ............. *H04L 41/142* (2013.01); *G06N 7/01* (2023.01); *H04L 41/0613* (2013.01); *H04L 41/0631* (2013.01); *H04L 41/5022* (2013.01)

(58) Field of Classification Search
None
See application file for complete search history.

(56) References Cited

U.S. PATENT DOCUMENTS

2017/0236064 A1*   8/2017   Kirschnick ............. F02D 41/22
                                                                   702/35
2017/0270419 A1*   9/2017   Sánchez Charles ..... G06N 7/01
(Continued)

OTHER PUBLICATIONS

Author: Devin Soni Titile: "Introduction to Markov Chains" Year: 2018 URL: https://towardsdatascience.com/introduction-to-markov-chains-50da3645a50d (Year: 2018).*

(Continued)

*Primary Examiner* — John A Follansbee
*Assistant Examiner* — Kamal M Hossain
(74) *Attorney, Agent, or Firm* — Ryan, Mason & Lewis, LLP

(57) ABSTRACT

An apparatus comprises a processing device configured to identify a given one of one or more assets in an information technology infrastructure associated with a support indicator associated with a priority level, and to obtain information characterizing state transitions of the one or more assets. The processing device is also configured to determine, based at least in part on a current state of the given asset identified utilizing the obtained information, a probability of the given asset transitioning to each of a plurality of states and to select, based at least in part on the determined probabilities, one of the plurality of states as a predicted future state of the given asset utilizing conformal prediction. The processing device is further configured to modify the priority level of the support indicator associated with the given asset based at least in part on the predicted future state of the given asset.

20 Claims, 18 Drawing Sheets

(51) Int. Cl.
*H04L 41/147* (2022.01)
*H04L 41/40* (2022.01)
*H04L 43/0817* (2022.01)

(56) References Cited

U.S. PATENT DOCUMENTS

| | | | |
|---|---|---|---|
| 2019/0370613 A1* | 12/2019 | Arngren | G06V 10/95 |
| 2020/0240875 A1* | 7/2020 | Venkateswaran | G01M 99/005 |
| 2021/0117822 A1* | 4/2021 | Vishwakarma | G06N 20/00 |
| 2021/0241180 A1* | 8/2021 | Vishwakarma | G06F 11/008 |
| 2022/0215273 A1* | 7/2022 | Sethi | G06N 5/04 |

OTHER PUBLICATIONS

Author: Cortés-Ciriano et al. Titile: ""Concepts and Applications of Conformal Prediction in Computational Drug Discovery"" Year: 2019 URL: https://arxiv.org/abs/1908.03569 (Year: 2019).*

D. Soni, "Introduction to Markov Chains," https://towardsdatascience.com/introcution-to-markov-chains-50da3645a50d, Mar. 5, 2018, 4 pages.

G. Zeni et al., "Conformal Prediction: A Unified Review of Theory and New Challenges," arXiv:2005.07972v1, May 16, 2020, 36 pages.

* cited by examiner

| DEVICE | COMPONENT FROM WHICH ALERT IS GENERATED | ALERT TYPE | SEVERITY OF THE ALERT | TRANSITION OF THE COMPONENT OR DEVICE STATES (COLLATED FROM TELEMETRY DATA AND LOGS) | COMPLETE SOLUTION/ DEVICE FAILURE |
|---|---|---|---|---|---|
| R710 | HDD | HEAD FAILURE | CRITICAL | HEAD FAILURE → MEDIUM ERROR COUNT ON HDD → SYSTEM CRASH | YES |
| R710 | DIMM | CONFIGURATION MISMATCH | MEDIUM | DIMM FAILURE → PERFORMANCE DEGRADED BY 10% | NO |
| R720 | CPU | UNRECOVERABLE MACHINE FAILURE | CRITICAL | CPU FAILURE → SYSTEM CRASH | YES |
| R720 | CPU | SOFT ERROR | MEDIUM | CPU FAILURE → NO SYSTEM DISPLAY | NO |
| R710 | HDD | MEDIUM ERROR COUNTS | CRITICAL | MEMORY COUNTS ON HDD → RAID GROUP FAILURE → SYSTEM CRASH | YES |
| R710 | MOTHERBOARD | AGING OF BATTERY | CRITICAL | MOTHERBOARD FAILURE → SYSTEM CRASH | YES |
| R720 | MOTHERBOARD | OVERHEAT | MEDIUM | MOTHERBOARD FAILURE → DIMM FAILURE → PERFORMANCE DEGRADED BY 10% | NO |
| R720 | FAN | DUST | CRITICAL | FAN FAILURE → OVERHEAT OF CPU → CPU FAILURE → SYSTEM CRASH | YES |
| R710 | FAN | REDUCED SPEED | MEDIUM | FAN FAILURE → PERFORMANCE DEGRADED BY 10% | NO |
| R710 | HDD | RAID GROUP FAILURE | CRITICAL | RAID GROUP FAILURE → SYSTEM CRASH | YES |

FIG. 6

| DATE | CUSTOMER NUMBER | COMPONENT FROM WHICH THE ALERT IS GENERATED | LATEST TRANSITION STATES OF THE DEVICE THAT HAVE BEEN RECORDED |
|---|---|---|---|
| 01-02-2019 | 123 | FAN | FAN FAILURE → OVERHEAT OF CPU → CPU FAILURE → SYSTEM CRASH |
| 01-02-2019 | 234 | FAN | FAN FAILURE → PERFORMANCE DEGRADED BY 10% |
| 01-03-2019 | 356 | FAN | FAN FAILURE → PERFORMANCE DEGRADED BY 10% |
| 01-03-2019 | 123 | FAN | FAN FAILURE → DIMM FAILURE → SYSTEM CRASH |
| 01-05-2019 | 234 | FAN | FAN FAILURE → OVERHEAT OF CPU → HDD HEAD FAILURE |
| 01-06-2019 | 356 | FAN | FAN FAILURE → PERFORMANCE DEGRADED BY 10% |
| 01-07-2019 | 123 | FAN | FAN FAILURE → SYSTEM CRASH |
| 01-08-2019 | 234 | FAN | FAN FAILURE → PERFORMANCE DEGRADED BY 10% |
| 01-09-2019 | 356 | FAN | FAN FAILURE → HDD HEAD FAILURE → RAID GROUP FAILURE → SYSTEM CRASH |
| 01-09-2019 | 356 | FAN | FAN FAILURE → HDD HEAD FAILURE → SYSTEM CRASH |

| CURRENT DEVICE STATE | FUTURE DEVICE STATE (TRANSITIONED DEVICE STATE) | PROBABILITY OF TRANSITION TO THE FUTURE DEVICE STATE | |
|---|---|---|---|
| FAN FAILURE | PERFORMANCE DEGRADED BY 10% | 0.4 | PROBABILITY OF GOING FROM FAN FAILURE TO PERFORMANCE DEGRADED BY 10% IS S13/S1 = 4/10 = 0.4 |
| FAN FAILURE | OVERHEAT OF CPU | 0.2 | PROBABILITY OF GOING FROM FAN FAILURE TO OVERHEAT OF CPU IS S12/S1 = 2/10 = 0.2 |
| FAN FAILURE | HDD HEAD FAILURE | 0.2 | PROBABILITY OF GOING FROM FAN FAILURE TO HDD HEAD FAILURE IS S16/S1 = 2/10 = 0.2 |
| FAN FAILURE | DIMM FAILURE | 0.1 | PROBABILITY OF GOING FROM FAN FAILURE TO DIMM FAILURE IS S14/S1 = 1/10 = 0.1 |
| FAN FAILURE | SYSTEM CRASH | 0.1 | PROBABILITY OF GOING FROM FAN FAILURE TO SYSTEM CRASH IS S15/S1 = 1/10 = 0.1 |

FIG. 8C

| CURRENT DEVICE STATE | NEXT DEVICE STATE | PROBABILITY OF STATE TRANSITION |
|---|---|---|
| FAN FAILURE | PERFORMANCE DEGRADED BY 10% | 0.4 |
| FAN FAILURE | OVERHEAT OF CPU | 0.2 |
| FAN FAILURE | HDD HEAD FAILURE | 0.2 |
| FAN FAILURE | DIMM FAILURE | 0.1 |
| FAN FAILURE | SYSTEM CRASH | 0.1 |
| MEDIUM ERROR COUNTS OF HDD | RAID GROUP FAILURE | 0.3 |
| MEDIUM ERROR COUNTS OF HDD | HDD HEAD FAILURE | 0.4 |
| MEDIUM ERROR COUNTS OF HDD | SYSTEM CRASH | 0.3 |
| HDD HEAD FAILURE | RAID GROUP FAILURE | 0.5 |
| HDD HEAD FAILURE | MEDIUM ERROR COUNTS OF HDD | 0.5 |
| CPU FAILURE | NO SYSTEM DISPLAY | 0.2 |
| CPU FAILURE | SYSTEM CRASH | 0.8 |
| MOTHERBOARD FAILURE | NO SYSTEM DISPLAY | 0.3 |
| MOTHERBOARD FAILURE | SYSTEM CRASH | 0.4 |
| MOTHERBOARD FAILURE | DIMM FAILURE | 0.1 |

FIG. 8D

| CURRENT DEVICE STATE | NEXT DEVICE STATE | PROBABILITY OF STATE TRANSITION |
|---|---|---|
| SYSTEM CRASH | - | - |
| ALL COMPONENTS ARE GOOD | CPU FAILURE | 0.09 |
| ALL COMPONENTS ARE GOOD | FAN FAILURE | 0.09 |
| ALL COMPONENTS ARE GOOD | RAID GROUP FAILURE | 0.09 |
| ALL COMPONENTS ARE GOOD | HDD HEAD FAILURE | 0.09 |
| ALL COMPONENTS ARE GOOD | MOTHERBOARD FAILURE | 0.09 |
| ALL COMPONENTS ARE GOOD | MEDIUM ERROR COUNTS OF HDD | 0.09 |
| ALL COMPONENTS ARE GOOD | SYSTEM CRASH | 0.09 |
| ALL COMPONENTS ARE GOOD | NO SYSTEM DISPLAY | 0.09 |
| ALL COMPONENTS ARE GOOD | DIMM FAILED | 0.09 |
| ALL COMPONENTS ARE GOOD | OVERHEAT OF CPU | 0.09 |
| ALL COMPONENTS ARE GOOD | HDD FAILURE | 0.09 |
| PERFORMANCE DEGRADED BY 10% | DIMM FAILURE | 0.5 |
| PERFORMANCE DEGRADED BY 10% | HDD FAILURE | 0.5 |

| CURRENT DEVICE STATE | NEXT DEVICE STATE | PROBABILITY OF STATE TRANSITION |
|---|---|---|
| OVERHEAT OF CPU | CPU FAILURE | 0.2 |
| OVERHEAT OF CPU | HDD FAILURE | 0.2 |
| OVERHEAT OF CPU | DIMM FAILURE | 0.2 |
| OVERHEAT OF CPU | MOTHERBOARD FAILURE | 0.2 |
| DIMM FAILURE | PERFORMANCE DEGRADED BY 10% | 1 |
| NO SYSTEM DISPLAY | MOTHERBOARD FAILURE | 0.5 |
| NO SYSTEM DISPLAY | CPU FAILURE | 0.5 |
| RAID GROUP FAILURE | SYSTEM CRASH | 1 |

FIG. 8F

| CALIBRATION (RAID GROUP FAILURE) | | |
|---|---|---|
| TARGET | PROBABILITY | RANK |
| RAID GROUP FAILURE | 1 | 0 |
| RAID GROUP FAILURE | 1 | 1 |
| RAID GROUP FAILURE | 0.62 | 2 |
| RAID GROUP FAILURE | 0.61 | 3 |
| RAID GROUP FAILURE | 0.6 | 4 |
| RAID GROUP FAILURE | 0.59 | 5 |
| RAID GROUP FAILURE | 0.58 | 6 |
| RAID GROUP FAILURE | 0.57 | 7 |
| RAID GROUP FAILURE | 0.56 | 8 |
| RAID GROUP FAILURE | 0.53 | 9 |
| RAID GROUP FAILURE | 0.52 | 10 |
| RAID GROUP FAILURE | 0.51 | 11 |
| RAID GROUP FAILURE | 0.5 | 12 |
| RAID GROUP FAILURE | 0.45 | 13 |
| RAID GROUP FAILURE | 0.4 | 14 |

PROACTIVE ASSET FAILURE REMEDIATION UTILIZING CONFORMAL ASSET STATE PREDICTION

FIELD

The field relates generally to information processing, and more particularly to techniques for managing information processing systems.

BACKGROUND

Support platforms may be utilized to provide various services for computing devices managed by the support platforms. Such services may include, for example, troubleshooting and remediation of issues encountered on computing devices managed by a support platform. This may include periodically collecting information on the state of the managed computing devices, and using such information for troubleshooting and remediation of the issues. Services of a support platform may also or alternatively include management of software that is installed on computing devices. This may include various software vendors communicating with the support platform when upgrades are available for different applications or other software, and the support platform pushing such upgrades to the computing devices that it manages.

SUMMARY

Illustrative embodiments of the present disclosure provide techniques for proactive asset failure remediation utilizing conformal prediction of asset states.

In one embodiment, an apparatus comprises at least one processing device comprising a processor coupled to a memory. The at least one processing device is configured to perform the steps of identifying a given one of one or more assets in an information technology infrastructure associated with a support indicator, the support indicator being associated with a priority level, and obtaining information characterizing state transitions of the one or more assets in the information technology infrastructure. The at least one processing device is also configured to perform the steps of determining, based at least in part on a current state of the given asset identified utilizing the obtained information, a probability of the given asset transitioning to each of a plurality of states and selecting, based at least in part on the determined probabilities, one of the plurality of states as a predicted future state of the given asset utilizing conformal prediction. The at least one processing device is further configured to perform the step of modifying the priority level of the support indicator associated with the given asset based at least in part on the predicted future state of the given asset.

These and other illustrative embodiments include, without limitation, methods, apparatus, networks, systems and processor-readable storage media.

BRIEF DESCRIPTION OF THE DRAWINGS

FIG. 6 shows a table of telemetry data collected from devices in an illustrative embodiment.

FIGS. 8A-8F show tables of data utilized in performing conformal prediction of device state transitions in an illustrative embodiment.

FIGS. 10A and 10B show calibration tables utilized for performing conformal prediction of device state transitions in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
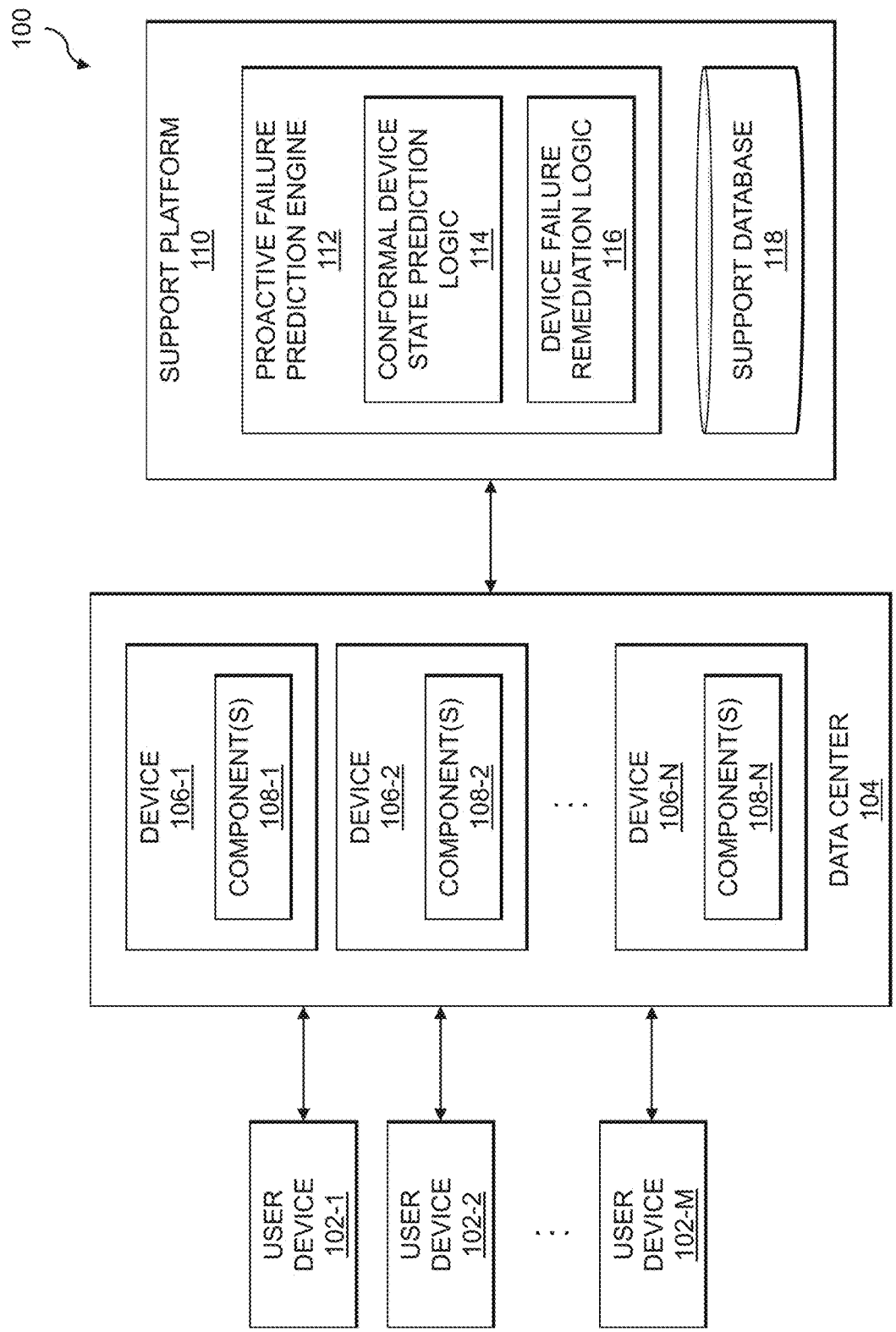
FIG. 1 is a block diagram of an information processing system configured for proactive asset failure remediation utilizing conformal prediction of asset states in an illustrative embodiment.

FIG. 1 shows an information processing system 100 configured in accordance with an illustrative embodiment. The information processing system 100 is assumed to be built on at least one processing platform and provides functionality for proactive asset failure remediation utilizing conformal prediction of asset states. The system 100 includes a set of user devices 102-1, 102-2, . . . 102-M (collectively, user devices 102) which are in communication with a data center 104 comprising a set of devices 106-1, 106-2, . . . 106-N (collectively, devices 106) each comprising one or more components 108-1, 108-2, . . . 108-N (components 108). The data center 104 is an example of what is more generally referred to herein as an information technology (IT) infrastructure, and the devices 106 are examples of what is more generally referred to herein as assets of the IT infrastructure. The assets (e.g., devices 106) may comprise physical and virtual computing resources. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

The user devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The user devices 102 may also or alternately comprise virtualized computing resources, such as VMs, containers, etc.

The user devices 102 in some embodiments comprise respective computers associated with a particular company, organization or other enterprise. Thus, the user devices 102 may be considered examples of assets of an enterprise system. In addition, at least portions of the system 100 may also be referred to herein as collectively comprising one or more "enterprises." Numerous other operating scenarios involving a wide variety of different types and arrangements of processing nodes are possible, as will be appreciated by those skilled in the art.

The information processing system 100 further includes a support platform 110. In some embodiments, the support platform 110 is used for an enterprise system. For example, an enterprise may subscribe to or otherwise utilize the support platform 110 to manage a set of assets of an IT infrastructure (e.g., devices 106 of the data center 104), user devices 102 operated by users of the enterprise, combinations thereof, etc. As used herein, the term "enterprise system" is intended to be construed broadly to include any group of systems or other computing devices. For example, the assets of the IT infrastructure (e.g., devices 106 of the data center 104) may provide a portion of one or more enterprise systems. A given enterprise system may also or alternatively include one or more of the user devices 102. In some embodiments, an enterprise system includes one or more data centers (e.g., the data center 104), cloud infrastructure comprising one or more clouds, etc. A given enterprise system, such as cloud infrastructure, may host assets that are associated with multiple enterprises (e.g., two or more different businesses, organizations or other entities).

Although not explicitly shown in FIG. 1, one or more input-output devices such as keyboards, displays or other types of input-output devices may be used to support one or more user interfaces to the user devices 102, data center 104, devices 106, and support platform 110, as well as to support communication between such components and other related systems and devices not explicitly shown.

The user devices 102 are configured to access or otherwise utilize the data center 104. In some embodiments, the user devices 102 are assumed to be associated with system administrators, IT managers or other authorized personnel responsible for managing assets of an IT infrastructure (e.g., devices 106 of data center 104). For example, a given one of the user devices 102 may be operated by a user to access a graphical user interface (GUI) provided by the support platform 110 to manage the devices 106 of the data center 104. The support platform 110 may be provided as a cloud service that is accessible by the given user device 102 to allow the user thereof to manage the devices 106 of the data center 104. In some embodiments, the devices 106 of the data center 104 are owned or operated by the same enterprise that operates the support platform 110 (e.g., where an enterprise such as a business provides support for the assets it operates). In other embodiments, the devices 106 of the data center 104 may be owned or operated by one or more enterprises different than the enterprise which operates the support platform 110 (e.g., a first enterprise provides support for assets that are owned by multiple different customers, businesses, etc.). Various other examples are possible.

In other embodiments, the support platform 110 may provide support for the user devices 102, instead of or in addition to providing support for the devices 106 of the data center 104. For example, the support platform 110 may be operated by a hardware vendor that manufactures and sells computing devices (e.g., desktops, laptops, tablets, smartphones, etc.), and the user devices 102 may represent computing devices sold by that hardware vendor. The support platform 110, however, is not required to be operated by a hardware vendor that manufactures and sells computing devices (e.g., the user devices 102, the devices 106, combinations thereof, etc.). Instead, the support platform 110 may be offered as a service to provide support for computing devices that are sold by any number of hardware vendors. The user devices 102 may subscribe to the support platform 110, so as to provide support including proactive failure prediction and remediation of the user devices 102 and/or devices 106 of the data center 104. Various other examples are possible.

In some embodiments, the user devices 102 may implement host agents that are configured for automated transmission of information regarding state of the user devices 102 or devices 106 (e.g., such as in the form of telemetry data, support or other application logs, or other information periodically provided to the support platform 110). Such host agents may also be configured to automatically receive from the support platform 110 recommendations for proactive remedial measures to take to prevent one or more of the user devices 102 and/or devices 106 from reaching a predicted failure state. The host agents may be further configured to automatically implement such recommended remedial measures. It should be noted that a "host agent" as this term is generally used herein may comprise an automated entity, such as a software entity running on a processing device. Accordingly, a host agent need not be a human entity.

As shown in FIG. 1, the support platform 110 comprises a proactive failure prediction engine 112 implementing conformal device state prediction logic 114 and device failure remediation logic 116. The support platform 110 also includes a support database 118, which is assumed to store information related to states and state transitions of the devices 106 (or components 108 thereof) in the data center 104. The support database 118 may also store information such as telemetry data, support or other application logs, alerts, support tickets, cases or other types of support indicators, and various other information which is utilized in predicting device state transitions and performing proactive remediation (e.g., to prevent the devices 106 or components 108 thereof from transitioning to or reaching failure states). The support database 118 in some embodiments is implemented using one or more storage systems or devices associated with the support platform 110. In some embodiments, one or more of the storage systems utilized to implement the support database 118 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

The user devices 102, data center 104 and support platform 110 are assumed to be coupled via one or more networks (not explicitly shown in FIG. 1). The networks may comprise a global computer network such as the Internet, although other types of networks can be part of the networks, including a wide area network (WAN), a local area network (LAN), a satellite network, a telephone or cable network, a cellular network, a wireless network such as a WiFi or WiMAX network, or various portions or combinations of these and other types of networks.

Although shown as an element of the support platform 110 in this embodiment, the proactive failure prediction engine 112 in other embodiments can be implemented at least in part externally to the support platform 110, for example, as a stand-alone server, set of servers or other type of system coupled to the user devices 102 and/or the data center 104 via one or more networks. In some embodiments, the support platform 110 and/or the proactive failure prediction engine 112 may be implemented at least in part within one or more of the user devices 102 and/or the data center 104.

The proactive failure prediction engine 112 in the FIG. 1 embodiment is assumed to be implemented using at least one processing device. Each such processing device generally comprises at least one processor and an associated memory, and implements logic for controlling certain features of the proactive failure prediction engine 112. In the FIG. 1 embodiment, the proactive failure prediction engine 112 includes conformal device state prediction logic 114 and device failure remediation logic 116.

The proactive failure prediction engine 112 is configured to identify ones of the devices 106 in the data center 104 that are associated with support tickets, cases or other types of support indicators submitted to the support platform 110. The conformal device state prediction logic 114 is configured to determine, for a given one of the devices 106 (e.g., device 106-1) associated with a support indicator submitted to the support platform 110, a probability of the given device 106-1 transitioning from its current state to one or more of a plurality of states (e.g., utilizing a Markov chain). To do so, the conformal device state prediction logic 114 may utilize information characterizing state transitions of the given device 106-1 (and potentially other ones of the devices 106 in the data center 104), where such information is obtained from telemetry data, application logs, or combinations thereof. Such information may be periodically collected and stored in the support database 118. The conformal device state prediction logic 114 then applies a conformal prediction framework (e.g., a Mondrian conformal prediction framework) to predict the future state of the given device 106-1 with confidence. Based on the predicted future state of the given device 106-1, the priority level for the support indicator associated with the given device 106-1 may be modified. For example, if the predicted future state is a failure state, the priority level may be increased such that the support platform 110 may remediate the support indicator prior to the given device 106-1 reaching the failure state.

It is to be appreciated that the particular arrangement of the support platform 110, the proactive failure prediction engine 112, the conformal device state prediction logic 114, the device failure remediation logic 116 and the support database 118 illustrated in the FIG. 1 embodiment is presented by way of example only, and alternative arrangements can be used in other embodiments. As discussed above, for example, the support platform 110, the proactive failure prediction engine 112, the conformal device state prediction logic 114, the device failure remediation logic 116 and the support database 118 may in some embodiments be implemented internal to one or more of the user devices 102 and/or the data center 104.

At least portions of the proactive failure prediction engine 112, the conformal device state prediction logic 114 and the device failure remediation logic 116 may be implemented at least in part in the form of software that is stored in memory and executed by a processor.

It is to be understood that the particular set of elements shown in FIG. 1 for proactive device failure remediation utilizing conformal device state prediction is presented by way of illustrative example only, and in other embodiments additional or alternative elements may be used. Thus, another embodiment may include additional or alternative systems, devices and other network entities, as well as different arrangements of modules and other components.

By way of example, in other embodiments, the proactive failure prediction engine 112 may be implemented external to the support platform 110, such that the support platform 110 can be eliminated.

The support platform 110 and other portions of the system 100, as will be described in further detail below, may be part of cloud infrastructure.

The support platform 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The user devices 102, data center 104 and support platform 110, or components thereof (e.g., devices 106, components 108, proactive failure prediction engine 112, conformal device state prediction logic 114, device failure remediation logic 116, and support database 118) may be implemented on respective distinct processing platforms, although numerous other arrangements are possible. For example, in some embodiments at least portions of the support platform 110 and one or more of the user devices 102 or the data center 104 are implemented on the same processing platform. A given user device (e.g., 102-1) can therefore be implemented at least in part within at least one processing platform that implements at least a portion of the support platform 110.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 to reside in different data centers. Numerous other distributed implementations are possible. The support platform 110 can also be implemented in a distributed manner across multiple data centers.

Additional examples of processing platforms utilized to implement the support platform 110 in illustrative embodiments will be described in more detail below in conjunction with FIGS. 11 and 12.

It is to be appreciated that these and other features of illustrative embodiments are presented by way of example only, and should not be construed as limiting in any way.

An exemplary process for proactive asset failure remediation utilizing conformal prediction of asset states will now be described in more detail with reference to the flow diagram of FIG. 2. It is to be understood that this particular process is only an example, and that additional or alternative processes for proactive asset failure remediation utilizing conformal prediction of asset states may be used in other embodiments.

In this embodiment, the process includes steps 200 through 208. These steps are assumed to be performed by the proactive failure prediction engine 112 of the support platform 110 utilizing the conformal device state prediction logic 114 and the device failure remediation logic 116. The process begins with step 200, identifying a given one of one or more assets (e.g., devices 106) in an IT infrastructure (e.g., data center 104) associated with a support indicator, the support indicator being associated with a priority level. In step 202, information characterizing state transitions of the one or more assets in the IT infrastructure is obtained. The obtained information may comprise telemetry data collected from the one or more assets in the IT infrastructure, application logs from one or more tools that monitor that one or more assets in the IT infrastructure, combinations thereof, etc.

In step 204, a probability of the given asset transitioning to each of a plurality of states is determined based at least in part on a current state of the given asset identified utilizing the information obtained in step 202. Step 204 may include utilizing a Markov chain, such as by utilizing a transition matrix obeying the Markov chain, wherein rows of the transition matrix represent possible values of the current state of the asset and columns of the transition matrix represent possible future states of the asset. In some embodiments, step 204 includes: calculating transition counts from the current state of the given asset to each of the plurality of states in the information characterizing state transitions of the one or more assets in the information technology infrastructure obtained in step 202; and calculating probabilities of the given asset transitioning from the current state to each of the plurality of states as a ratio of the calculated transition count for each of the plurality of states to the sum of the transition counts for the plurality of states. Step 204 may further include constructing a graph comprising nodes representing respective ones of the plurality of states, and edges connecting the nodes representing the calculated probabilities.

Figure 2:
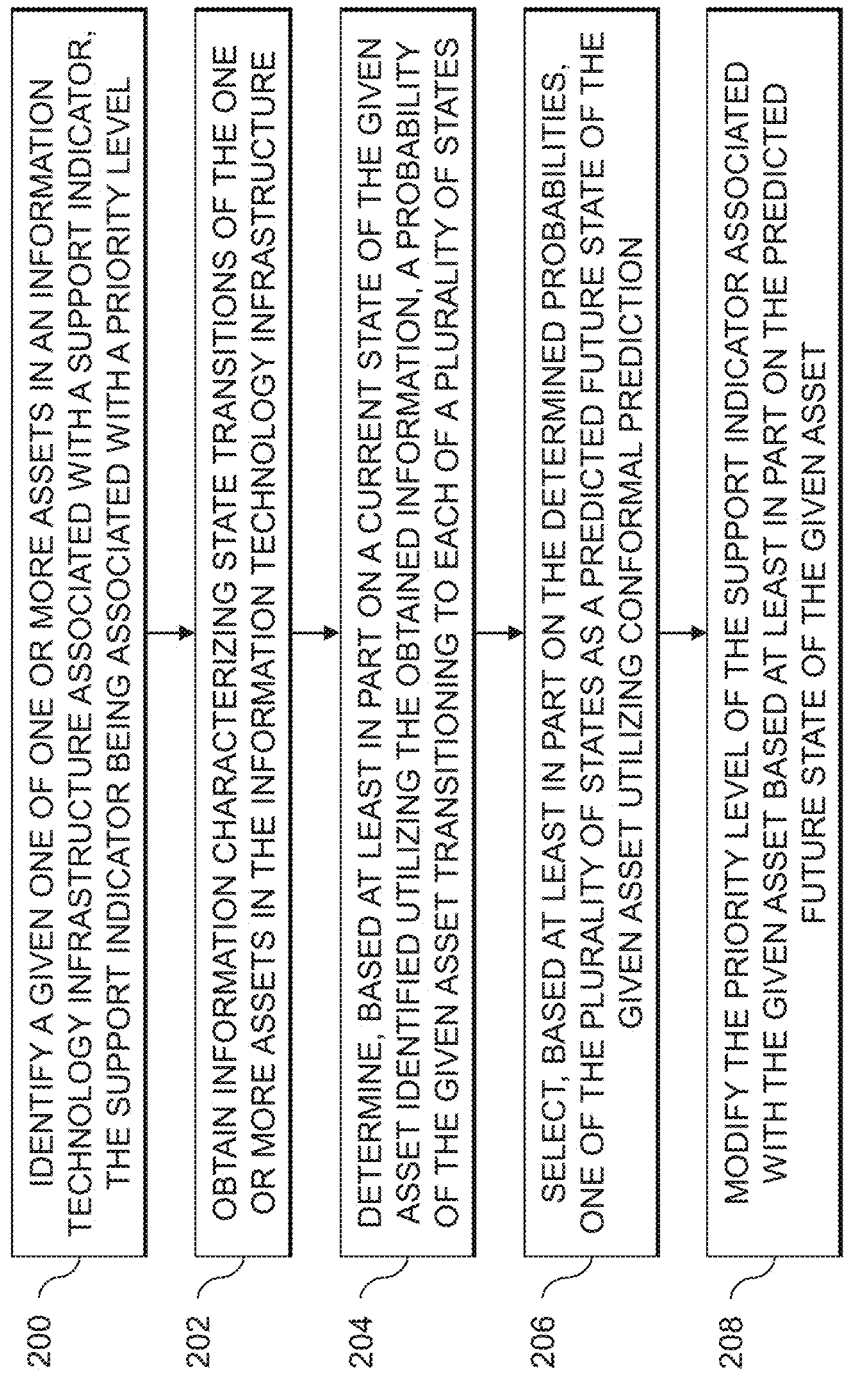
FIG. 2 is a flow diagram of an exemplary process for proactive asset failure remediation utilizing conformal prediction of asset states in an illustrative embodiment.

The FIG. 2 process continues with step 206, selecting, based at least in part on the determined probabilities, one of the plurality of states as a predicted future state of the given asset utilizing conformal prediction. Step 206, in some embodiments, utilizes Mondrian conformal prediction. The Mondrian conformal prediction may include generating a calibration table for each of two or more of the plurality of states, where the two or more of the plurality of states are associated with a same determined probability in step 206. The calibration table for a given one of the plurality of states may comprise a ranked ordering of predicted probabilities of reaching the given state, the predicted probabilities of reaching the given state being determined utilizing a random forest algorithm. Selecting one of the plurality of states as the predicted future state of the given asset utilizing Mondrian conformal prediction may further comprise selecting a given one of the two or more states having a highest confidence level exceeding a designated confidence threshold. The confidence level for the given state may be determined by: identifying a rank of the determined probability for the given state in the calibration table for the given state; determining a number of rankings below the identified rank in the calibration table for the given state; and calculating a ratio of the determined number of rankings below the identified rank in the calibration table for the given state to a total number of rankings in the calibration table for the given state.

The priority level of the support indicator associated with the given asset is modified in step 208 based at least in part on the predicted future state of the given asset. Step 208 may include increasing the priority level of the support indicator responsive to the predicted future state of the given asset being a failure state. The priority level of the support indicator may control or otherwise be used to select remedial actions to be applied to the given asset. Such remedial actions may include assigning the support indicator to technical support staff or analysts, increasing resources available to the technical support staff or analysts to which the support indicator has been assigned, increasing available options for the technical support staff or analysts to remediate the support indicator, etc.

In a data center, system management applications and tools may monitor devices uninterruptedly and provide remedial measures for alerts received from the devices. The devices in the data center are an example of what is more generally referred to herein as "assets" of an IT infrastructure, where the assets may include physical computing resources, virtual computing resources, combinations thereof. The system management applications and tools may run on the devices or assets themselves, or may run on separate devices or assets responsible for monitoring or providing support for the data center. When an alert from a device is generated, details of the faulty component(s) are collected at the time of failure and are collated as telemetry data. A support ticket or case, which are examples of what is more generally referred to herein as a support indicator, may be generated for, or based on, the telemetry data. The support ticket or case may be assigned an appropriate priority level, and the support ticket or case is shared to a technical support team or other entity responsible for providing support for the devices of the data center, or more generally assets of an IT infrastructure. The technical support team is responsible for analyzing the support ticket or case, and for providing a solution to resolve the issue(s) encountered.

In some cases, at least portions of the telemetry data (e.g., containing information related to both hardware components and firmware of a device) can be recorded manually by users or automatically at pre-defined time intervals set by the system management applications. This telemetry data helps the support team to resolve encountered issues quickly, by providing the support team with collected logs or other information describing the reason for failure or other issues with particular components of a device, or for the entire device as a whole.

Figure 3:
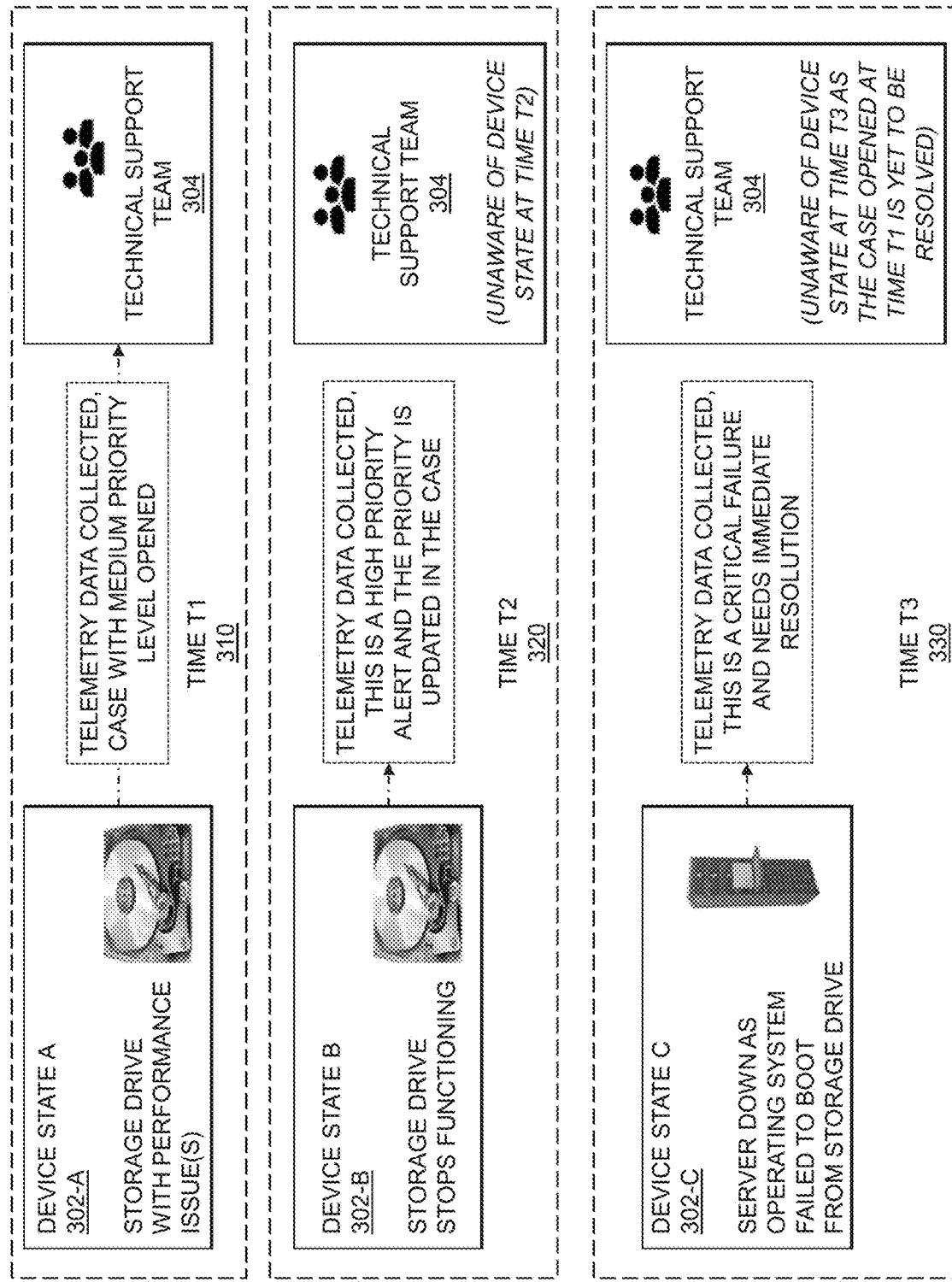
FIG. 3 shows transitioning of a device between different states in an illustrative embodiment.

FIG. 3 illustrates an example of transitioning of a device state, where the device comprise a server with one or more storage drives. At time T1 310, the device is in state A 302-A, where a storage drive (e.g., a hard drive (HDD) or other type of storage device) reports one or more performance issues. Telemetry data is collected, and a support ticket or case is opened with a "medium" priority level. This support ticket or case is then submitted to a technical support team 304 for resolution at time T1 310. Depending on the assigned priority level of the support ticket or case, it can take some time for the technical support team 304 to provide a resolution for the performance issue. In this example, it is assumed that at a time T2 320 following time T1 310, the device transitions to state B 302-B, where the storage drive stops working and another alert is generated. Details relating to the device state will be captured as telemetry data at time T2 320. The technical support team 304, however, may be unaware of the device state at time T2 320. Continuing further, at time T3 330, the device may now be in state C 302-C where the device (e.g., the server) is down because the operating system (OS) failed to boot from the storage drive which was experiencing performance issues at time T1 310 and which stopped functioning at time T2 320. The device state 302-C is one in which the server is rendered non-responsive, which is a critical failure and a "critical" priority case is submitted to the technical support team 304. At the time T3 330, the resolution for the support ticket or case raised at time T1 310 may be available, but it is of no value as the storage drive was already corrupted and stopped functioning at time T2 320. Also, the critical issue raised at time T3 330 needs to be resolved as it has the highest priority level of "critical."

Currently, there are no system management applications and tools with the intelligence to identify the next state of the device (e.g., which may be a failure state) and to predict the impact of the device reaching the next state (e.g., a failure state). Illustrative embodiments meet these and other needs, providing techniques for proactive device failure remediation utilizing conformal device state prediction. Continuing with the example, above, the current device state A 302-A at time T1 310 may be used to predict a next device state (e.g., the storage drive with performance issues will stop functioning, a server with that storage device will be rendered non-responsive, etc.). Using the techniques described herein, the next device state may be used to predict the impact of issues with a storage drive affecting other elements of a data center that rely on that storage device (e.g., a storage area network (SAN), network attached storage (NAS), etc.).

Figure 4:
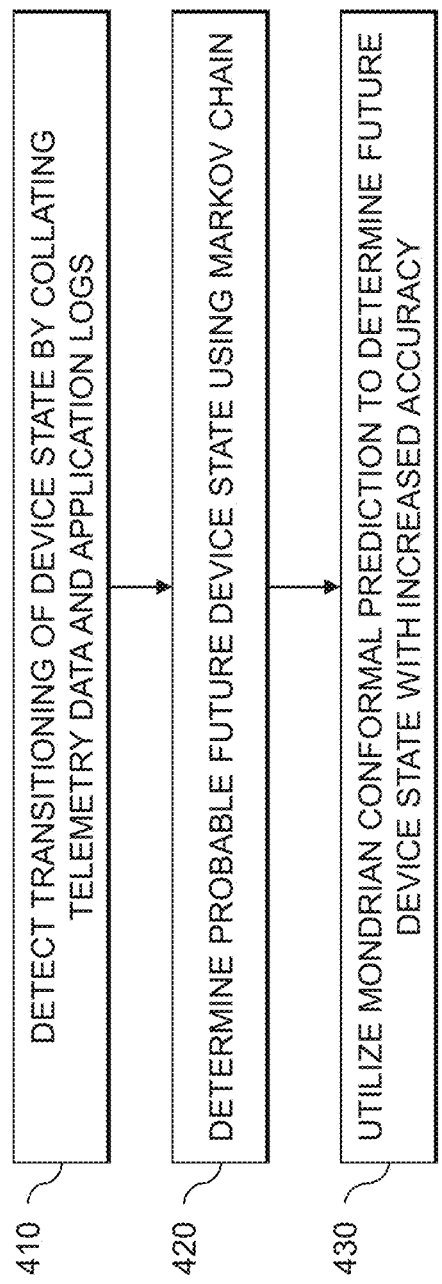
FIG. 4 shows a process flow for proactive conformal prediction of device state transitions in an illustrative embodiment.

In illustrative embodiments, techniques for proactive conformal prediction of device state transitions during failure scenarios proceed in three main steps or stages as illustrated in FIG. 4. In a first step or stage 410, device states are collected with the help of telemetry data and application logs for various device operations (e.g., both internal and external) to detect the transitioning of the device state. In a second step or stage 420, a Markov chain and a transition matrix are used to calculate the next probable device state. At the second step or stage 420, the next probable device state cannot be guaranteed, and thus in a third step or stage 430 Mondrian conformal prediction is utilized to ascertain the next device state that the device would transition to from the current state if the issue(s) currently encountered by the device are not resolved. At the third step or stage 430, a more accurate set of transitioned device states are obtained.

Figure 5:
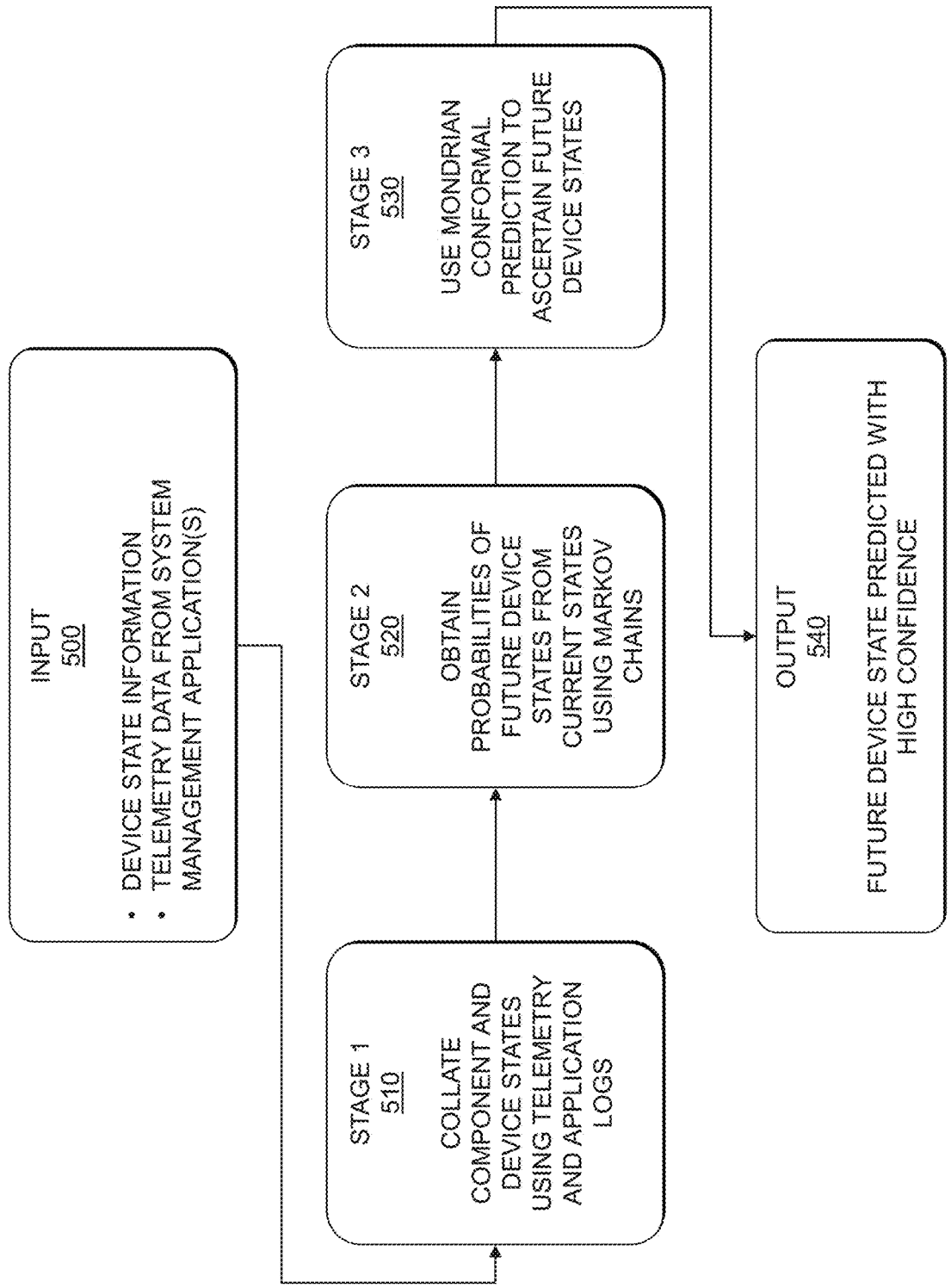
FIG. 5 shows prediction of a future device state utilizing proactive conformal prediction in an illustrative embodiment.

FIG. 5 illustrates a solution flow for transitioning between the three steps or stages described above in conjunction with FIG. 4. In the FIG. 5 solution flow, the input 500 includes telemetry data collected using system management applications or tools. The input 500 is then processed in three stages 510, 520 and 530 (which correspond to the three steps or stages 410, 420 and 430 described above in conjunction with FIG. 4). In the first stage 510, the component or device states are collated using the telemetry data and application logs. In the second stage 520, probable future device states (that may be transitioned to from the current device state) are calculated using a Markov chain. In the third stage 530, a definitive future device state is calculated with confidence using Mondrian conformal prediction. This results in output 540, which is the future device state predicted with high confidence. It should be noted that, in this context, a "high" confidence refers to level a confidence that is greater than that which would be achieved from prediction of the future device state using Markov chains alone.

As described above with respect to FIGS. 4 and 5, the solution in some embodiments is divided into the three steps or stages. During the first stage, the current state and the transitioned state of the components or devices are collected using the telemetry data and application logs. This data set is then processed using the Markov Chain satisfying the Markov Property which is the second stage of the solution. The probable device states are then analyzed using the Mondrian Conformal Prediction to get the next transition state(s) of the components or devices with more confidence in the third stage. The final output or result is the future device state that a device is most likely to transition to from the current state of the device. The current state of the device is assumed to be one at which an issue is encountered or an alert is raised resulting in a support ticket, case or other support indicator being submitted to a support platform. This helps to assign an appropriate priority level, based on the criticality of the most likely future device state, to the support indicator. Consider again the example of FIG. 3. If the techniques described herein were applied in this case, then the initial priority level at time T1 310 may be assigned as "high" or "critical" given the likelihood that the current device state 302-A (storage drive experiencing performance issues) will transition to the device state 302-B and then device state 302-C. Thus, the technical support team 304 may pick up the support ticket or case sooner, to provide a resolution which avoids any system down time (e.g., which would result if the device transitions to device states 302-B and 302-C).

The three steps or stages of the solution will now be described in further detail. In the first stage, component and device states are collated using telemetry data and application logs. The telemetry data may be collected by system management applications or tools at periodic intervals, when requested manually by a user, etc. The telemetry data provides data of the state of the component or device over some period of time. Along with the telemetry data, application logs for various device operations may also be collected which provide further information on the component or device state. Such application logs may be periodically uploaded as per intervals that are configured by a user, or which may be automated via system management applications or tools. The telemetry data and application logs may be attached to a support ticket, case or other support indicator when that support ticket, case or other support indicator is created. The telemetry data and application logs, when collated, provide the component or device state, as well as device states that the device has transitioned to and from before and during resolution of the support ticket, case or other support indicator. FIG. 6 shows a table 600 of sample data collected using telemetry data and application logs. The table 600 includes columns for a device identifier, a component from which an alert is generated, an alert type, a severity of the alert, a transition of the component or device states (collated from the telemetry data and application logs), as well as an indication as to whether this particular alert is representative of a complete solution or device failure. In the second stage, Markov chains are used to ascertain the probability of the next device or component state. The telemetry data collected by the system management applications and tools, along with application or other support logs recorded when support tickets, cases or other support indicators are acted upon, provide information that may be utilized to predict the next state that a device or component reporting issues will reach. To calculate the probability of the future device states, some embodiments utilize a mathematical framework which gives the probable future device state(s) depending on what the current device state is. With the current device state, and the probabilities of going to the next or future device state, a Markov chain can be built. In some embodiments, the Markov chain is used because it may not matter how a component or device reached its current state. Instead, the possible next device states are dependent on the current device state alone.

Figure 7:
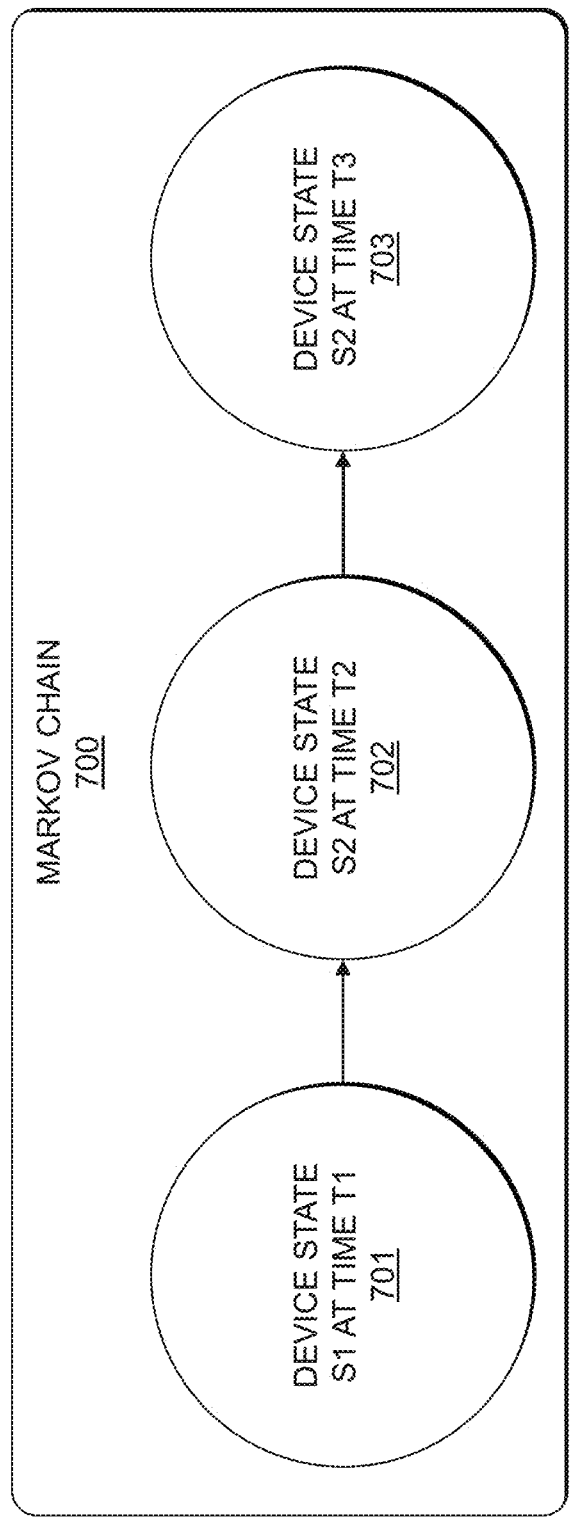
FIG. 7 shows a Markov chain of device states in an illustrative embodiment.

When an alert is generated for a component or device, the future state of that component or device can be predicted without requiring knowledge on the details of how that component or device has reached its present state. In other words, a future state can be predicted based only on the present state of the device. This is achieved through the stochastic process of a Markov chain. A Markov chain of device states S1, S2, S3, etc. at times t1, t2, t3, etc. can be formed only when the Markov property is satisfied. Consider, for example, the Markov chain 700 shown in FIG. 7, which shows a device state S1 at time T1 701, a device state S2 at time T2 702 and a device state S3 at time T3 703. Here, the device state S3 is only dependent on the device state S2, and the device state S1 is irrelevant. The state of a Markov chain is the value of $X_t$ at time t. Continuing with the above example, S2 is the device state at time t. The state space, S, of a Markov chain is the values that $X_t$ can take. With these values, a trajectory is formed for values X. The basic property of a Markov chain is that only the most recent point (e.g., the most recent device state) in the trajectory affects the next point (e.g., the next device state). The solution described herein uses the following Markov Property formula:

$$P(X_{t+1}=S|X_t=S_t, X_{t-1}=S_{t-1}, \ldots X_0=S_0) = P(X_{t+1}=S|X_t=S_t)$$

for all t=1,2,3 ... and for all device states $S_0, S_1, S_2, \ldots S_t$, S. To calculate the next probable device state, a transition diagram may be used. The transition between two device states is plotted in a transition diagram. A matrix obeying the Markov chain is the transition matrix:

Insert future device states, $S(t+1)$

Insert current device state, $S(t) \begin{pmatrix} \ldots & \ldots \\ \ldots & \ldots \\ \ldots & \ldots \end{pmatrix}$ The rows in the device transition matrix represent the current device state (Now) and should add to 1. The columns represent the future device state (Next) and should also add to 1. The transition matrix, denoted P, lists all the possible device states in the state space S. The transition matrix P is a square matrix, because its values are in the same state space S of size N.

$$p_{ij} = P(X_{t+1}=j|X_t=i)$$

where the probability of transitioning from state i to state j, is the conditional probability that Next j given that Now i is the entry (i, j).

Figure 8B:
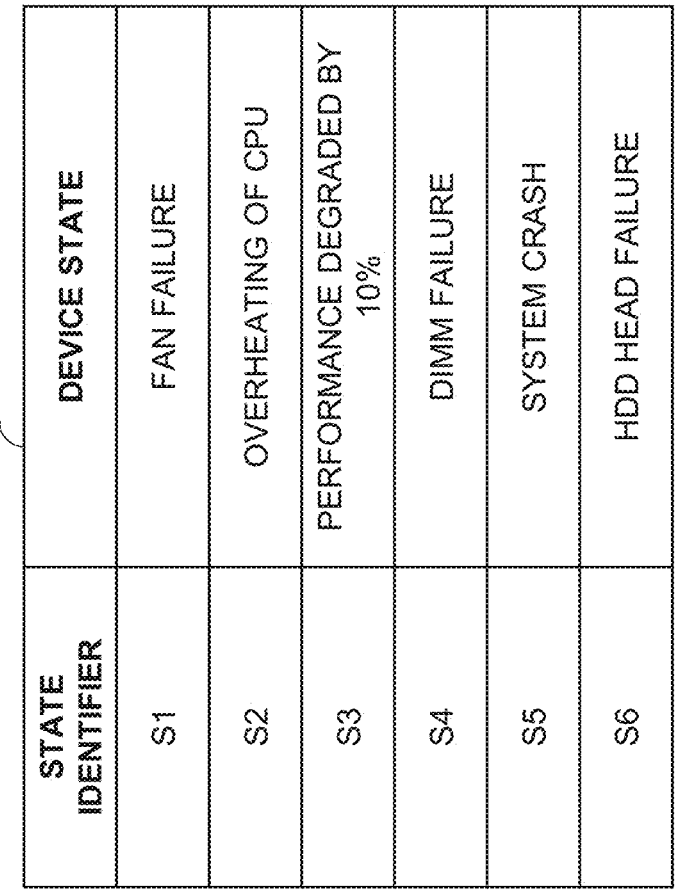

FIGS. 8A-8C illustrate calculation of probable future device states using a Markov chain. FIG. 8A shows a table 800 of example telemetry data. The table 800 includes columns for the date, customer number or identifier, the component from which an alert is generated, and the latest transition states of the device that have been recorded. From this sample data set, the set of device states is shown in the table 805 of FIG. 8B. The table 805 includes columns for the state identifier and their corresponding device states. An example of calculations of transition counts from state S1 (fan failure) to the subsequent device states S1 through S6 is as follows: S11 (S1→S1)=0, S12 (S1→S2)=2, S13 (S1→S3)=4, S14 (S1→S4)=1, S15 (S1→S5)=1, S16 (S1→S6)=2. The probability of state S1, irrespective of the states it is going to transition to is S1=S11+S12+S13+S14+S15+S16. In this example, S1=0+2+4+1+1+2; S1=10. FIG. 8C shows a table 810 illustrating the calculated results. The table 810 includes columns for the current device state, the future device state (e.g., the transitioned device state), and the probability of transition to the future device state. The sample calculations shown in the table 810 are for one of the rows of the transition matrix. Similar calculations may be performed for other rows of the transition matrix.

Figure 9:
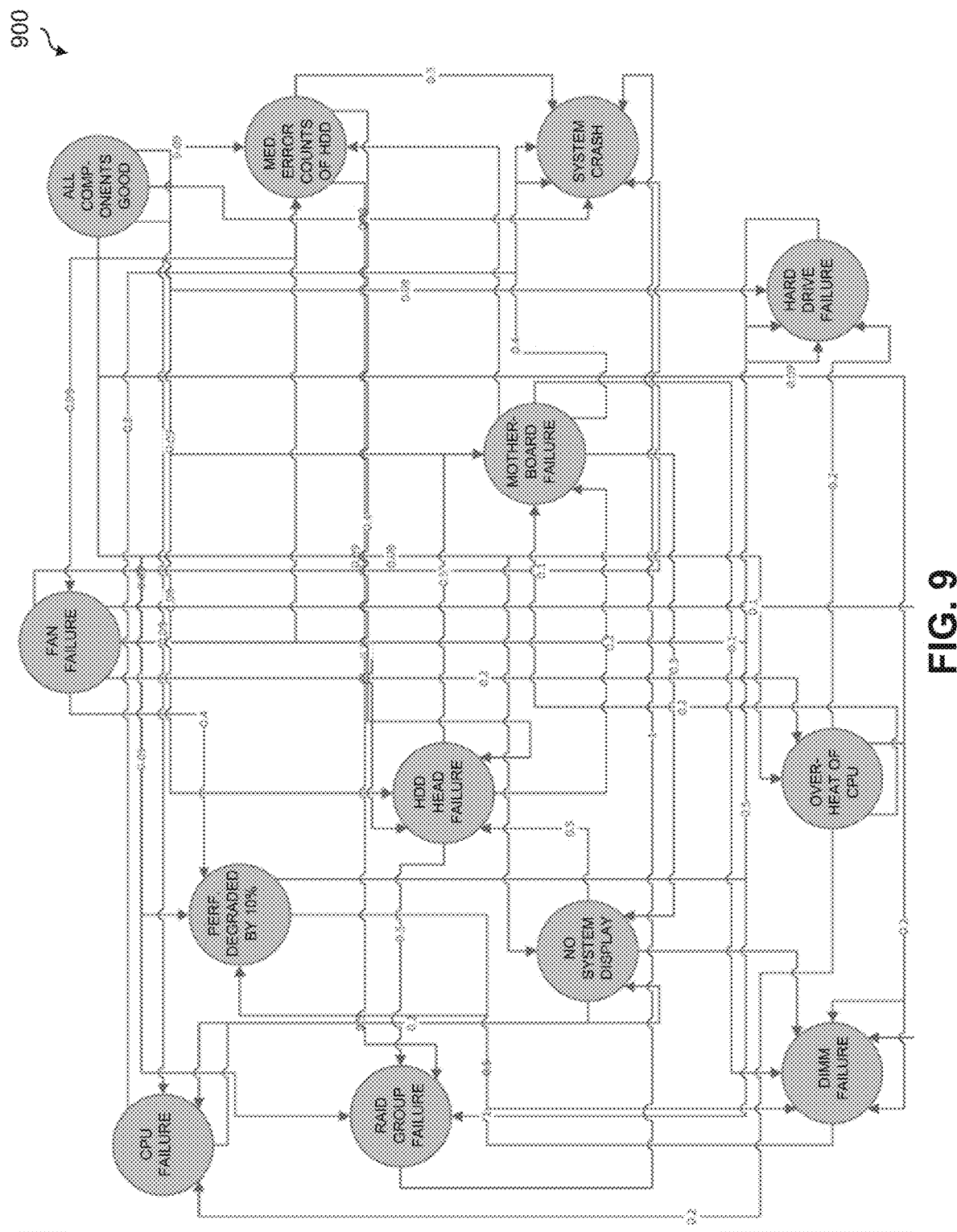
FIG. 9 shows a graph plotting future component or device states utilizing a Markov chain in an illustrative embodiment.

With the telemetry data and device applications logs, a table 815 may be derived. The table 815 (shown in three parts 815-1, 815-2 and 815-3 in FIGS. 8D, 8E and 8F, respectively) lists the sample data set collected through the telemetry data, with columns for the current device state and the future device state. The calculated probability of the transitioned device state is listed in another column. Although FIGS. 8D-8F show respective portions of a single table 815, in other embodiments a distinct or separate table may be generated for each of the current device states (e.g., fan failure, medium error counts of HDD, HDD head failure, CPU failure, motherboard failure, system crash, all components are good, performance degraded by 10%, overheat of CPU, dual in-line memory module (DIMM) failure, no system display, and redundant array of independent disks (RAID) group failure). FIG. 9 shows a graph 900, which plots the future state of the component or device using the Markov chain. The current and future device states are shown in circles, with the device states connected by lines with associated values comprising the probability ratio calculated utilizing the Markov chain.

In the third stage, Mondrian conformal prediction is used to ascertain the future device state (with a higher confidence level than that achieved using the Markov chain alone). Based on the probability ratio derived using the Markov chain, the future device states are predicted. It is desired, however, to be as certain as possible regarding the future transitioned state of the device so as to take appropriate remedial measures. Thus, Mondrian conformal prediction is used to ascertain the future device states with confidence. The advantage of the using the Mondrian conformal prediction is the guaranteed validity of the future device state. In Mondrian conformal prediction, the data set containing the probabilities of the transition of device states is split into three subsets used for training, calibration and testing. In some embodiments, a random forest algorithm with 100 trees is used as a reference for calculating the conformity measure of the predicted device state probabilities.

Figure 10B:

Consider the example calibration subset with 20 data points, including 15 data points for RAID group failure shown in table 1000 in FIG. 10A and 5 data points for medium error counts of HDD shown in table 1005 of FIG. 10B. The calibration subset is further divided into sets of future device states, and predictions are generated (e.g., using random forest principles). Then, the next device states are sorted by their predicted probability and ranks are assigned for the sorted rows. Such information is shown in the calibration tables 1000 and 1005 of FIGS. 10A and 10B, respectively. Each of the calibration tables 1000 and 1005 is for one class as per Mondrian conformal prediction.

An example of predicting the next state with confidence using Mondrian conformal prediction will now be described. As per the Markov chain, the probability of the transitioned device state for RAID group failure is p(RAID group failure)=0.5 and the probability of the transitioned device state for HDD error counts is p(Medium error counts of HDD)=0.5. This tie needs to be broken to predict the next state with confidence. With random forest predicted probability rankings, a determination is made as to where these states fall in a ranking, a P-value is determined, and a prediction set is determined with a user-defined confidence. Determining the rank of states includes determining that the rank of p(RAID group failure) is 12 out of 14 (from table 1000) and that the rank of p(Medium error counts of HDD) is 3 out of 4 (from table 1005). Next, the P-value for each is determined. Theoretically, the P-value is the probability of getting an unusual result, or a more unusual result if the null hypothesis is true. The P-values may be determined from the rankings in the tables 1000 and 1005. The ranking table 1000 for RAID group failure has 15 entries, two of which are ranked lower or below the probability 0.5. Thus, for RAID group failure, unusual results that can happen or which are left are 2 (e.g., there are two probabilities ranked lower than 0.5, ranks 13 and 14), out of a possible 15 ranks. Thus, the P-value of RAID group failure is 2/15=0.133. Similarly, the P-value of Medium error counts of HDD is 1/5=0.2.

Now, the user can select the confidence level that is needed to ascertain the next device state. Consider, as an example, a confidence of 80% which is 0.8 (C). So, the significance level (alpha) is 1−C=1−0.8=0.2. When the P-value (class) is greater than or equal to the significance level, the class will be a member of the prediction set. Those which are not greater than the set significance level are omitted from the prediction set. Continuing with the above example, the P-value for Medium error counts of HDD is 0.2, which is greater than or equal to the significance level of 0.2. The P-value of RAID group failure is 0.133, which is less than the significance level of 0.2. Thus, the prediction set in this example is {Medium error counts of HDD}. Thus, after the three stages of the solution described herein, the transition of the device state is ascertained with confidence and the appropriate priority level of a support ticket, case or other support indicator is changed or updated accordingly. The support team can then provide the best resolution for the alerts raised by the components or devices.

Illustrative embodiments provide a number of advantages relative to conventional approaches. For example, the solutions described herein provide a method for predicting the next device state (which may be a device failure state) from the current device state (which may also be a device failure state) of any internal component of a device, or of the device itself, even before the device enters an abnormal state (e.g., where an alert may be raised). In this way, embodiments are able to predict if a "minor" failure (e.g., associated with a relatively low priority alert) can or is likely to lead to a "major" failure (e.g., associated with a relatively high priority alert) or not. Further, this prediction is made with a confidence factor by tapping into the historical transitions of similar types of issues on similar devices. The techniques described herein can further be used to ascertain, based on the confidence factor and severity, if an issue or alert (e.g., associated with a support ticket, case or other support indicator) raised for a device or a component thereof is not responded to, whether that issue or alert is likely to lead to a complete failure of the component or the device in a data center. Thus, the severity of the issue or alert may be modified (e.g., raised) in a proactive approach to lead to faster or more prioritized resolution.

The proactive methods described herein understand the transition of a device in case of any failure, even before an alert comes "back home" (e.g., to the hardware vendor of the component or device). This is in contrast to conventional approaches, where such vendors are relying on alerts that are received. The techniques described herein provide such information a step ahead, in that such alerts may be predicted before they would otherwise be raised or otherwise generated. Further, the proactive methods described herein for determining upcoming failure (e.g., in the form of a future predicted device state) with a confidence factor (e.g., in the form of conformal confidence) can be supplied to device administrators or other technical support teams for initiating proactive remedial measures.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for proactive asset failure remediation utilizing conformal prediction of asset states will now be described in greater detail with reference to FIGS. 11 and 12. Although described in the context of system 100, these platforms may also be used to implement at least portions of other information processing systems in other embodiments.

Figure 11:
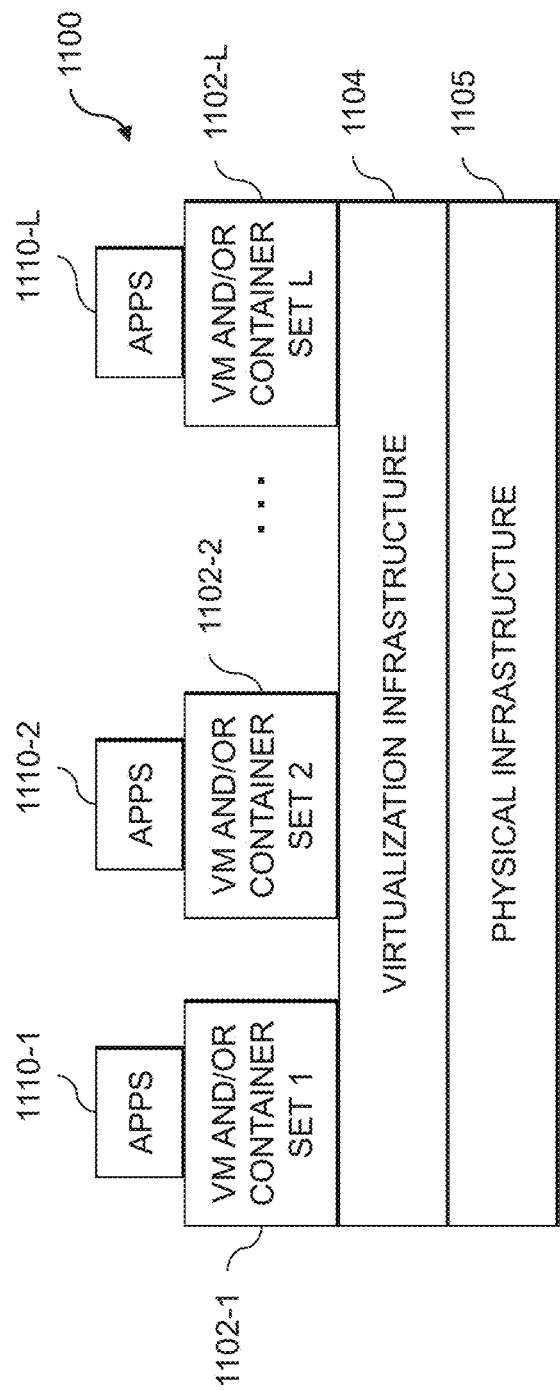
FIGS. 11 and 12 show examples of processing platforms that may be utilized to implement at least a portion of an information processing system in illustrative embodiments.
Figure 12:
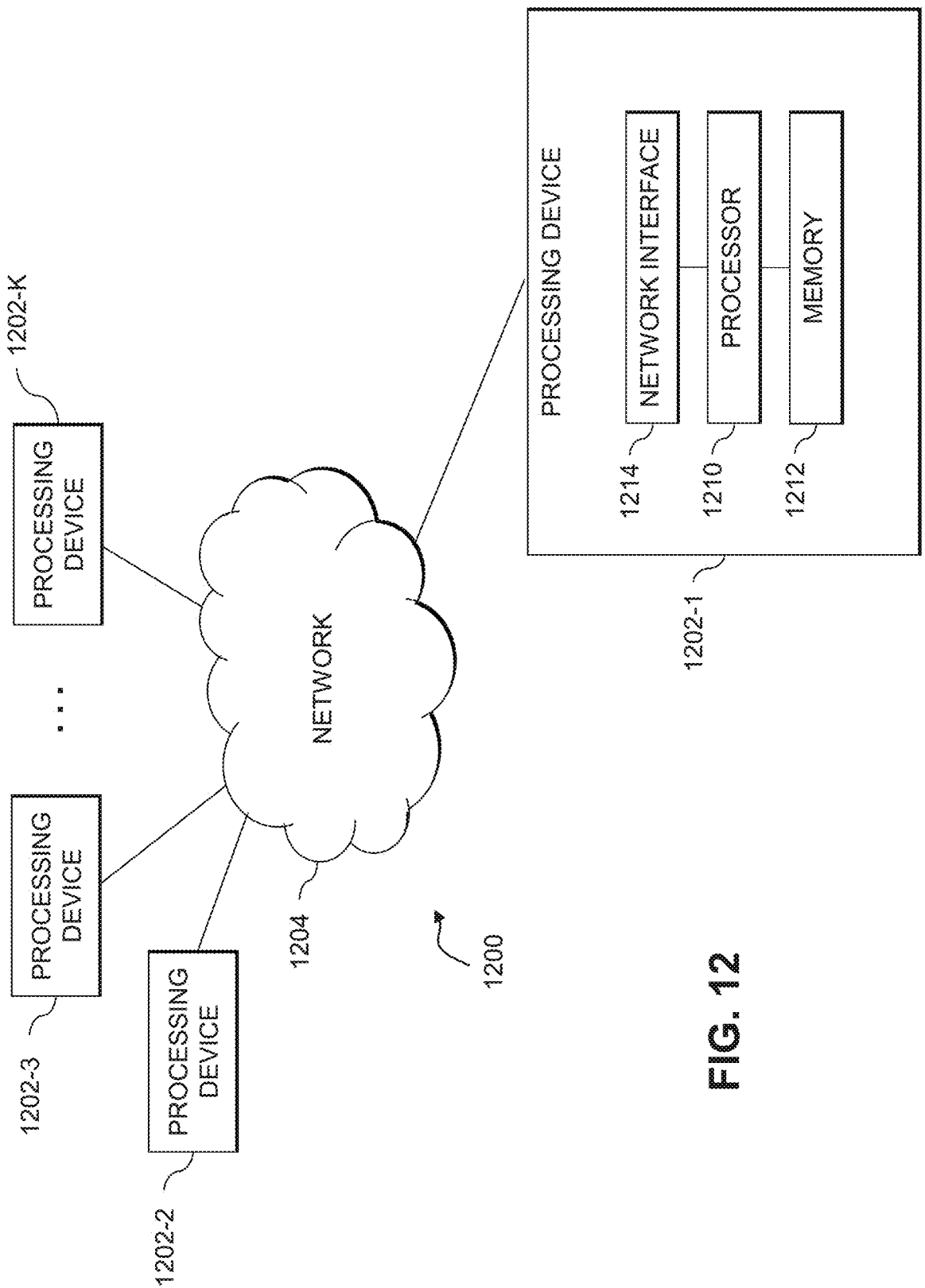

FIG. 11 shows an example processing platform comprising cloud infrastructure 1100. The cloud infrastructure 1100 comprises a combination of physical and virtual processing resources that may be utilized to implement at least a portion of the information processing system 100 in FIG. 1. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. A hypervisor platform may be used to implement a hypervisor within the virtualization infrastructure 1104, where the hypervisor platform has an associated virtual infrastructure management system. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of system 100 and includes a plurality of processing devices, denoted 1202-1, 1202-2, 1202-3, . . . 1202-K, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212.

The processor 1210 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1212 may comprise random access memory (RAM), read-only memory (ROM), flash memory or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for proactive asset failure remediation utilizing conformal prediction of asset states as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, devices, device states, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
   identifying a given one of one or more assets in an information technology infrastructure associated with a support indicator, the support indicator being associated with a priority level;
   obtaining information characterizing state transitions of the one or more assets in the information technology infrastructure;
   determining, based at least in part on a current state of the given asset identified utilizing the obtained information, two or more asset transition probabilities for the given asset, a first one of the two or more asset transition probabilities characterizing probability of the given asset transitioning to a first one of a plurality of states, a second one of the two or more asset transition probabilities characterizing probability of the given asset transitioning to a second one of the plurality of states different than the first one of the plurality of states, the first state being associated with a first one of two or more types of failure, and the second state being associated with a second one of the two or more types of failure, the second type of failure being different than the first type of failure, the two or more types of failure being associated with respective different failure severities;

selecting, based at least in part on the determined two or more asset transition probabilities, a given one of the plurality of states as a predicted future state of the given asset utilizing conformal prediction, the conformal prediction characterizing relative rankings of (i) the determined first asset transition probability for the given asset among a first set of possible asset transition probabilities for transitioning to the first state and (ii) the determined second asset transition probability for the given asset among a second set of possible asset transition probabilities for transitioning to the second state; and modifying the priority level of the support indicator associated with the given asset based at least in part on a given one of the two or more types of failure associated with the predicted future state of the given asset.

2. The apparatus of claim 1 wherein the obtained information characterizing state transitions of the one or more assets in the information technology infrastructure comprises telemetry data collected from the one or more assets in the information technology infrastructure.

3. The apparatus of claim 1 wherein the obtained information characterizing state transitions of the one or more assets in the information technology infrastructure comprises application logs from one or more tools that monitor the one or more assets in the information technology infrastructure.

4. The apparatus of claim 1 wherein determining the two or more asset transition probabilities comprises determining the two or more asset transition probabilities utilizing a Markov chain.

5. The apparatus of claim 4 wherein determining the two or more asset transition probabilities comprises utilizing a transition matrix configured in accordance with the Markov chain, wherein rows of the transition matrix represent possible values of the current state of the given asset and columns of the transition matrix represent possible future states of the given asset.

6. The apparatus of claim 1 wherein determining the two or more asset transition probabilities comprises:

calculating transition counts from the current state of the given asset to each of the plurality of states in the obtained information characterizing state transitions of the one or more assets in the information technology infrastructure; and calculating a given asset transition probability of the given asset transitioning from the current state to the given state as a ratio of the calculated transition count for the given state to a sum of the transition counts for the plurality of states.

7. The apparatus of claim 6 wherein determining the two or more asset transition probabilities comprises constructing a graph comprising nodes representing respective ones of the plurality of states and edges connecting the nodes representing respective ones of the two or more asset transition probabilities.

8. The apparatus of claim 1 wherein selecting the given state as the predicted future state of the given asset utilizes Mondrian conformal prediction.

9. The apparatus of claim 8 wherein selecting the given state as the predicted future state of the given asset utilizing Mondrian conformal prediction comprises generating a calibration table for each of two or more of the plurality of states.

10. The apparatus of claim 9 wherein the two or more of the plurality of states are associated with a same determined asset transition probability.

11. The apparatus of claim 9 wherein the calibration table for the given state comprises a ranked ordering of predicted asset transition probabilities for transitioning to the given state.

12. The apparatus of claim 9 wherein selecting the given state as the predicted future state of the given asset utilizing Mondrian conformal prediction further comprises selecting the given state having a highest confidence level among the two or more states, the highest confidence level exceeding a designated confidence threshold.

13. The apparatus of claim 12, wherein the confidence level for the given state is determined by:

identifying a rank of the determined asset transition probability for the given state in the calibration table for the given state;

determining a number of rankings below the identified rank in the calibration table for the given state; and calculating a ratio of the determined number of rankings below the identified rank in the calibration table for the given state to a total number of rankings in the calibration table for the given state.

14. The apparatus of claim 1 wherein modifying the priority level of the support indicator associated with the given asset comprises increasing the priority level of the support indicator responsive to the predicted future state of the given asset being a failure state.

15. A computer program product comprising a non-transitory processor-readable storage medium having stored therein program code of one or more software programs, wherein the program code when executed by at least one processing device causes the at least one processing device to perform steps of:

identifying a given one of one or more assets in an information technology infrastructure associated with a support indicator, the support indicator being associated with a priority level;

obtaining information characterizing state transitions of the one or more assets in the information technology infrastructure;

determining, based at least in part on a current state of the given asset identified utilizing the obtained information, two or more asset transition probabilities for the given asset, a first one of the two or more asset transition probabilities characterizing probability of the given asset transitioning to a first one of a plurality of states, a second one of the two or more asset transition probabilities characterizing probability of the given asset transitioning to a second one of the plurality of states different than the first one of the plurality of states, the first state being associated with a first one of two or more types of failure, and the second state being associated with a second one of the two or more types of failure, the second type of failure being different than the first type of failure, the two or more types of failure being associated with respective different failure severities;

selecting, based at least in part on the determined two or more asset transition probabilities, a given one of the plurality of states as a predicted future state of the given asset utilizing conformal prediction, the conformal prediction characterizing relative rankings of (i) the determined first asset transition probability for the given asset among a first set of possible asset transition probabilities for transitioning to the first state and (ii) the determined second asset transition probability for the given asset among a second set of possible asset transition probabilities for transitioning to the second state; and modifying the priority level of the support indicator associated with the given asset based at least in part on a given one of the two or more types of failure associated with the predicted future state of the given asset.

16. The computer program product of claim 15 wherein selecting the given state as the predicted future state of the given asset utilizes Mondrian conformal prediction by:

generating a calibration table for each of two or more of the plurality of states, the calibration table for each of the plurality of states comprising a ranked ordering of predicted asset transition probabilities for transitioning to that state; and selecting the given state having a highest confidence level among the two or more states, the highest confidence level exceeding a designated confidence threshold, the confidence level for the given state being determined by: identifying a rank of the determined asset transition probability for the given state in the calibration table for the given state; determining a number of rankings below the identified rank in the calibration table for the given state; and calculating a ratio of the determined number of rankings below the identified rank in the calibration table for the given state to a total number of rankings in the calibration table for the given state.

17. The computer program product of claim 15 wherein modifying the priority level of the support indicator associated with the given asset comprises increasing the priority level of the support indicator responsive to the predicted future state of the given asset being a failure state.

18. A method comprising:

identifying a given one of one or more assets in an information technology infrastructure associated with a support indicator, the support indicator being associated with a priority level;

obtaining information characterizing state transitions of the one or more assets in the information technology infrastructure;

determining, based at least in part on a current state of the given asset identified utilizing the obtained information, two or more asset transition probabilities for the given asset, a first one of the two or more asset transition probabilities characterizing probability of the given asset transitioning to a first one of a plurality of states, a second one of the two or more asset transition probabilities characterizing probability of the given asset transitioning to a second one of the plurality of states different than the first one of the plurality of states, the first state being associated with a first one of two or more types of failure, and the second state being associated with a second one of the two or more types of failure, the second type of failure being different than the first type of failure, the two or more types of failure being associated with respective different failure severities;

selecting, based at least in part on the determined two or more asset transition probabilities, a given one of the plurality of states as a predicted future state of the given asset utilizing conformal prediction, the conformal prediction characterizing relative rankings of (i) the determined first asset transition probability for the given asset among a first set of possible asset transition probabilities for transitioning to the first state and (ii) the determined second asset transition probability for the given asset among a second set of possible asset transition probabilities for transitioning to the second state; and modifying the priority level of the support indicator associated with the given asset based at least in part on a given one of the two or more types of failure associated with the predicted future state of the given asset;

wherein the method is performed by at least one processing device comprising a processor coupled to a memory.

19. The method of claim 18 wherein selecting the given state as the predicted future state of the given asset utilizes Mondrian conformal prediction by:

generating a calibration table for each of two or more of the plurality of states, the calibration table for each of the plurality of states comprising a ranked ordering of predicted asset transition probabilities for transitioning that state; and selecting the given state having a highest confidence level among the two or more states, the highest confidence level exceeding a designated confidence threshold, the confidence level for the given state being determined by: identifying a rank of the determined asset transition probability for the given state in the calibration table for the given state; determining a number of rankings below the identified rank in the calibration table for the given state; and calculating a ratio of the determined number of rankings below the identified rank in the calibration table for the given state to a total number of rankings in the calibration table for the given state.

20. The method of claim 18 wherein modifying the priority level of the support indicator associated with the given asset comprises increasing the priority level of the support indicator responsive to the predicted future state of the given asset being a failure state.

* * * * *